United States Patent [19]
Geyer et al.

[11] Patent Number: 5,384,661
[45] Date of Patent: Jan. 24, 1995

[54] ARTICULATED DEVICE FOR SPACE VEHICLES, ESPECIALLY FOR TEMPORARILY SEALING THE APERTURE OF SPACE OPTICAL INSTRUMENTS

[75] Inventors: Freddy Geyer, Tanneron; Dominique Giraud, Le Cannet, both of France

[73] Assignee: Aerospatiale Societe Nationale Industrielle, Paris, France

[21] Appl. No.: 835,967
[22] PCT Filed: Jun. 20, 1991
[86] PCT No.: PCT/FR91/00494
 § 371 Date: Feb. 20, 1992
 § 102(e) Date: Feb. 20, 1992
[87] PCT Pub. No.: WO91/19645
 PCT Pub. Date: Dec. 26, 1991

[30] Foreign Application Priority Data
Jun. 21, 1990 [FR] France ................... 9007784
Nov. 27, 1990 [FR] France ................... 9014814

[51] Int. Cl.6 ............ G02B 5/00; G02B 26/02; G02B 23/00
[52] U.S. Cl. ..................... 359/894; 359/236; 359/399
[58] Field of Search ............ 359/509, 511–513, 359/600, 601, 609–613, 894, 896, 900, 225–236, 399, 430, 233–236, 223–226, 819; 354/234, 235; 244/102 R, 161, 158

[56] References Cited
U.S. PATENT DOCUMENTS

| | | | |
|---|---|---|---|
| 4,286,856 | 9/1981 | McGrath | 354/234 |
| 4,432,609 | 2/1984 | Dueker et al. | 359/236 |
| 4,869,021 | 9/1989 | Gregory | 359/894 |
| 5,128,796 | 7/1992 | Barney et al. | 359/216 |
| 5,258,874 | 11/1993 | Bajat et al. | 359/804 |
| 5,283,682 | 2/1994 | Ostaszewski | 359/221 |

FOREIGN PATENT DOCUMENTS
2564606 11/1985 France.
1111414 4/1968 United Kingdom.

*Primary Examiner*—Loha Ben
*Assistant Examiner*—Thong Nguyen
*Attorney, Agent, or Firm*—Remy J. VanOphem; John VanOphem

[57] ABSTRACT

An articulated device for space vehicles, for example, for temporarily sealing the aperture of a space optical instrument. The device includes a fixed support element for mounting on the vehicle and an auxiliary element such as a temporary sealing flap mounted to pivot with respect to the fixed support element around a hinge axis between a first configuration (e.g. wherein the aperture is sealed) and a second configuration. The auxiliary element is attached, by a frangible controlled-break component for making temporary connections, to a hinge shaft whose rotation between the first and second configuration is controlled by an actuator. A torsional resilient return device is secured to the auxiliary element and to the shaft while resiliently biasing the auxiliary element to rotate it around the shaft in a predetermined direction. The shaft is substantially loosely engaged in journal bearings which are rigidly fastened to the auxiliary element.

17 Claims, 7 Drawing Sheets

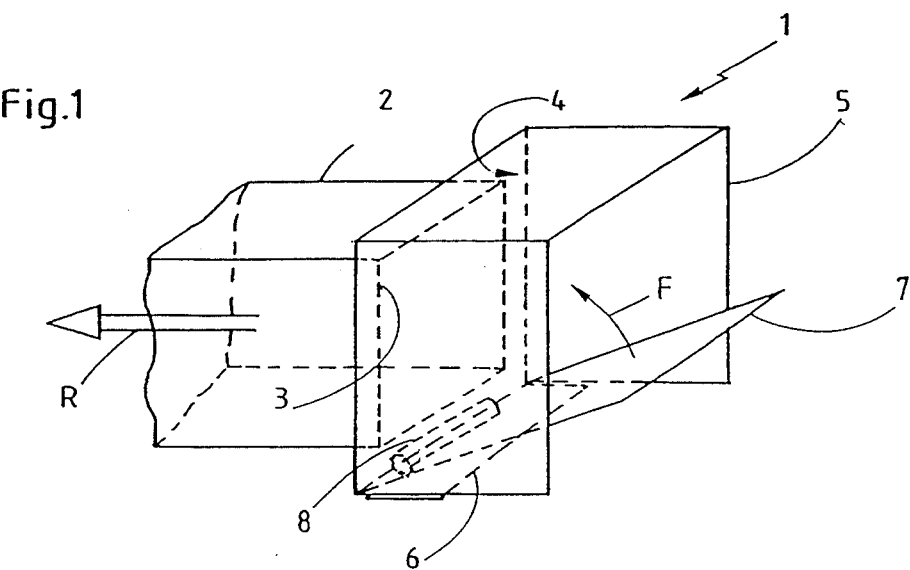
Fig.1
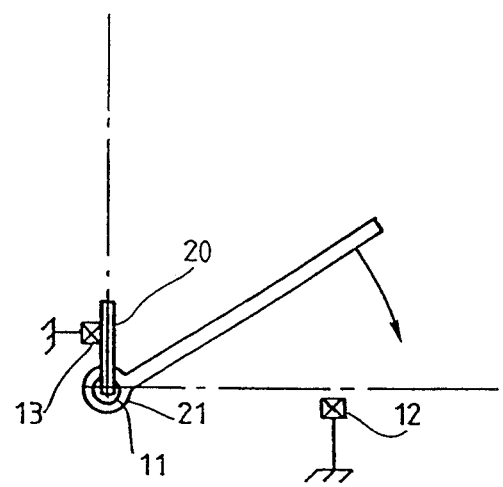
Fig.3
Fig.4
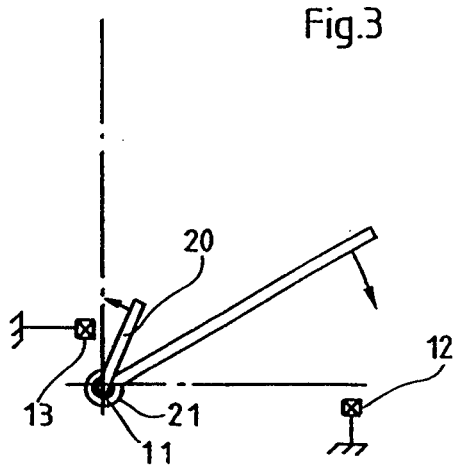
Fig.5

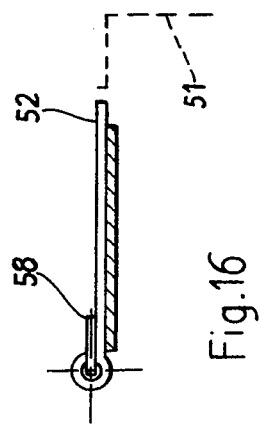
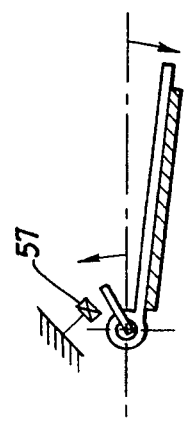
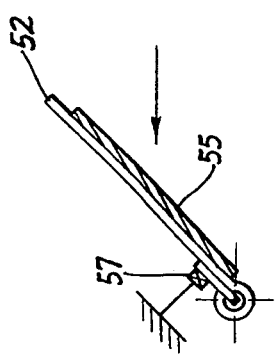
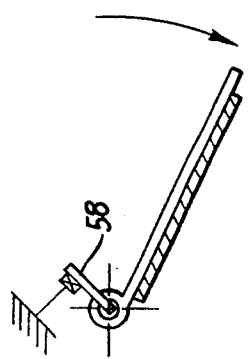
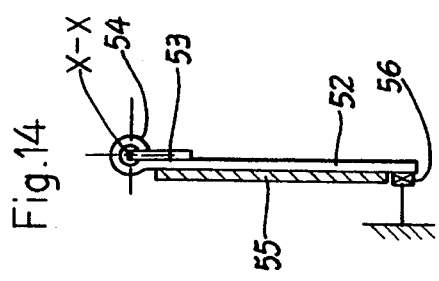
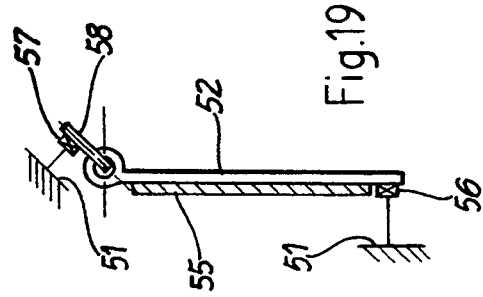

ARTICULATED DEVICE FOR SPACE VEHICLES, ESPECIALLY FOR TEMPORARILY SEALING THE APERTURE OF SPACE OPTICAL INSTRUMENTS

BACKGROUND OF THE INVENTION

1. Field of the Invention

The invention concerns the hinging of an auxiliary element adapted to move more than once to a space vehicle. It is directed to sealing and uncovering an aperture for example such as that of a space type optical system, for example a terrestrial or space observation telescope.

2. Description of the Prior Art

As is well known, there are certain phases in the life of a space optical system during which its aperture must be sealed. This is the case not only during launching of the space vehicle into which the space optical system is integrated (until the space vehicle reaches its service configuration) but also during the subsequent normal service life of the optical system, especially if because of the attitude of the space vehicle the optical system is subject to external attack (risk of glare from the Sun, risk of collision with foreign bodies, etc).

The sealing and uncovering of the aperture of a space optical system of this kind presupposes at least the maneuvering of a sealing flap or panel between an open configuration in which the aperture of the system is uncovered and a sealing configuration in which no beam of light or particles can enter the optical system.

In actual fact the aperture of an optical system is conventionally surrounded with a wall which in practice is usually called the aperture baffle or sunshade and is designed in particular to minimize entry into the optical system of unwanted light reaching the system in directions angularly offset to the nominal observation direction. The sealing flap is often hinged to the aperture baffle when present.

It should be made clear that the sealing flap under consideration here has a function (temporary protection) which is entirely different than that of the shutter of a camera which has to be operated at high speed so as to remain open only for a very short exposure time.

In practice the aperture baffle is made up of flaps hinged to move between a stowed configuration compatible with installation under the launch vehicle nose cone and a deployed configuration in which entry of unwanted light is minimized. Note, however, that these flaps move once only at the beginning of the lift of the satellite when they are deployed whereas the sealing flap must be able to be opened and closed several times during the life of the satellite. It will, therefore, be understood that the operational constraints that apply to the sealing flap are much more severe than those which apply to the wall of the aperture baffle.

It should also be made clear that the fact that the sealing flap operates in the vicinity of an optical system rules out the use of lubricants not only because of the surrounding vacuum of space but also because of the risk of pollution by these lubricants of any cold surfaces of the optical system (in the case of infrared observations, for example, which requires cooling of the optical system itself).

The operating constraints that apply to the sealing flap may be analyzed as follows:

the operation must allow a nominal opening/closing mode which is very reliable and remains so over long periods (several years with no possibility of direct human intervention): the mounting of this flap in the aperture baffle must, therefore, be very simple;

a degraded opening mode (or backup opening mode) must be provided for opening the flap should the nominal operating mode fail; if the flap has ceased to be maneuverable it must be immobilized in the open configuration (priority opening);

the degraded mode must be as reliable as possible, even after a long period of storage (up to ten years, for example) on the ground and/or in the vacuum of space and must not be subject to the same risks of failure as the nominal mode (redundancy);

the hardware elements operative in the nominal and degraded operating modes must be preserved as much as possible from mechanical damage (acceleration and vibration) during launch, from thermal damage and from constraints associated with the vacuum of space; and the total mass must be as small as possible (a usual constraint in space technology).

A partial solution to the aforementioned technical problem is given in U.S. Pat. No. 4,286,856 which concerns the remote operation of the shutter of a photographic instrument, in particular for taking sequences of photographs in the medical field (so that there is no sealing flap in the sense explained above). Here the shutter is fastened to the shaft driven by electromagnetic means adapted to rotate it in one direction while a spring is provided to rotate it in the opposite direction. The solution to be found in this document is a partial solution in the sense that there is no redundancy to be obtained from a degraded mode of operation (in one direction) which is independent of the nominal mode. There is a single operating mode and any failure of the spring or jamming of the shaft at the rotor/stator or at the bearings causes the shutter to jam irretrievably. In actual fact there is no justifiable requirement for redundancy in the technical field considered in this document.

French Patent No. 2,564,606 discloses a shutter unit especially suitable for aerial reconnaissance cameras which has a mobile flap adapted to slide with its edges in the slideways so as to close an aperture, actuated by drive means adapted to move it towards the first of at least two positions, reversing means being associated with the drive means to actuate the mobile flap towards the second of the two positions. In this disclosure the flap is joined to the shaft by two crank arms and the drive means include a rotary motor cooperating with the shaft through gearwheels. Spring means are provided for emergency opening of the flap in the event of failure of the motor. Once again, this is no more than a partial solution to the problem addressed by the inventor since there is no degraded mode independent of the nominal mode, any more so than in the previous document: any jamming of the shaft jams the flap until a repair can be carried out. This represents a sufficient level of redundancy since, in the case of an aerial reconnaissance pod, repair is possible after the aircraft returns to the ground. On the other hand, this document does not in any way consider a higher level of redundancy, as is addressed by the present invention.

SUMMARY OF THE INVENTION

The invention is directed to satisfying at least the first three of the above constraints, that is to say an object of the invention is a temporary sealing mechanism designed to be fixed to the aperture of an optical system constituting a sealing flap with no single failure point which is easy and reliable to maneuver in the nominal opening/closing mode and in a degraded mode independent of the nominal mode so that in the event of failure of the nominal mode it is possible to guarantee that the sealing flap goes to a predetermined one of its opened and closed configurations.

It should be noted that the invention presupposes that constraints associated with the stowage and the deployment of the baffle have been solved satisfactorily.

Very generally speaking, the object of the invention may be defined as a hinged and motorized auxiliary element for use in space movable about at least one pivot axis between two configurations and which is required to satisfy the following conditions:

- it must have a nominal control mode in respect of these configurations which is reliable and remains so for long periods;
- it must have a degraded mode of movement control which inevitably brings it to a predetermined configuration in the event of failure of the nominal mode; and
- the degraded mode must not be subject to the same risk of failure as the nominal mode (redundancy) and must offer long-term reliability.

The invention is also directed, over and above sealing flaps, to the case of certain moving parts (reflectors) of antennas.

To this end the invention proposes an articulated device for space vehicles having a fixed support element for mounting on the vehicle and a mobile auxiliary element mounted to pivot relative to the fixed support element about a hinge-axis between a first configuration and a second configuration. The auxiliary element is attached by a frangible controlled-break temporary connection component to a hinge shaft rotated between the first and second configurations by an actuator. A torsional resilient return device is secured to the auxiliary element and to the shaft and resiliently biases the auxiliary element to rotate it about the shaft in a predetermined direction. The shaft is engaged with substantial clearance in journal bearings which are rigidly fastened to the auxiliary element.

This clearance makes it possible to avoid mechanical damage during launch.

In the particular preferred case explained above in which the auxiliary element in question is a sealing flap, the invention provides a complete solution to the aforementioned problem by proposing a temporary sealing device adapted to be fixed to an entry aperture of a space optical instrument having a fixed support element adapted to be fixed to the aperture and a temporary sealing flap mounted to pivot relative to the fixed support element about a pivot axis at least between a closed configuration in which the flap closes off the entry aperture and an open configuration in which the flap exposes the entry aperture to radiation. The flap is fixed by a frangible controlled-break temporary connection component to a hinge shaft rotated between the first and second configurations by an actuator, and a torsional resilient return device is secured to the flap and to the shaft while resiliently biasing the flap to rotate about the shaft in a predetermined direction. The shaft is engaged with substantial clearance in journal bearings which are rigidly fastened onto the flap.

It will be understood that a structure of this kind uses different components for the various motor-drive functions in the nominal mode and in the degraded mode, the degraded mode using components which have not been previously mechanically loaded in the nominal mode. This is due in particular to the facility to dissociate the sealing flap from its shaft. There is, therefore, no single failure point.

A space optical instrument is sometimes required to have the following two functions:

- a calibration function whose object is to recalibrate the instrument in orbit relative to a stable source of known spectrum and intensity; the Sun is entirely suitable for this and can be employed for this purpose subject to the insertion of a diffuser (frosted glass) into the field of the instrument; the light from the Sun, diffused by reflection, then illuminates sensors situated in the focal plane; and
- the previously mentioned sealing function which is required to make it possible to measure the signal delivered by the sensors which are then totally unilluminated (this is known as "dark current calibration") and, in the case of loss of orbital platform attitude, to prevent the direct entry of sunlight which could damage the sensors.

A further object of the present invention is to minimize the overall dimensions and the number of the parts required for the calibration and sealing functions, while maximizing the reliability of these functions.

To this end, in a preferred embodiment of the invention, the fixed support element is adapted to be fixed to the vehicle near the aperture of a space optical instrument and the mobile auxiliary element is a temporary sealing flap provided on one side with a diffuser and which is adapted in the first configuration to orient the diffuser towards the aperture and towards incident radiation from the exterior and in the second configuration to provide free access to the aperture with an intermediate configuration in which the aperture is closed.

In this configuration the flap is preferably inclined at about 45° outwards relative to the intermediate sealing configuration and, in this latter configuration, about 90° inwards.

According to preferred features of the invention, some of which may be combined with others, explained below with reference to one or other of the temporary sealing flaps but generally applicable to any other hinged auxiliary element, the fixed support element is joined to a sunshade wall forming an aperture baffle for the optical system.

The device includes abutments rigidly fastened to the support element against which the auxiliary element bears in its first and second configurations.

The device includes at least one first abutment against which the auxiliary element bears in the first configuration and at least one second abutment against which the auxiliary element bears through at least one portion rigidly fastened onto the shaft in the second configuration.

The device includes means for locking the auxiliary element in at least one of its configurations which may be magnetic. The magnetic locking means includes magnets rigidly fastened onto the fixed support element adapted to cooperate with magnetic areas of the auxiliary element.

The actuator rotating the shaft relative to the fixed support element is a torque motor.

The frangible controlled-break temporary connection component is a pyrotechnic device which is disposed between the auxiliary element and a plate rigidly fastened onto the shaft in face-to-face relationship with the auxiliary element in a plane passing at least approximately through the hinge axis, the torsional resilient return device tending to move the plate away from the auxiliary element. A layer of non-stick material is disposed between the plate and the auxiliary element. The torsional resilient support device is a coil spring through which the hinge shaft passes, and the auxiliary element is a temporary sealing flap whose second configuration is an open configuration and the torsional resilient return means bias the flap in the direction towards the open configuration.

The invention also concerns the application of the temporary sealing device to a space telescope and further concerns a sealing mechanism in which the sealing flap also constitutes a diffuser.

Objects, features and advantages of the invention will emerge from the following description given by way of non-limiting example with reference to the appended drawings.

BRIEF DESCRIPTION OF THE DRAWINGS

FIG. 1 is a diagram showing an optical system aperture baffle constituted by a sealing mechanism in accordance with the invention;

FIG. 3 is a diagrammatic view in transverse cross-section of the sealing mechanism in a nominal operating mode;

FIG. 4 is a similar diagrammatic view in a degraded opening mode in the situation in which the sealing flap shaft is jammed;

FIG. 5 is a similar degraded mode view in the situation in which the shaft is not locked, or jammed in an intermediate configuration;

FIG. 14 is a diagrammatic view of the mechanism of FIG. 13 in transverse cross-section in an open configuration;

FIG. 15 is a similar diagrammatic view of the mechanism in a calibration configuration;

FIG. 16 is a similar diagrammatic view of the mechanism in an intermediate sealing configuration;

FIG. 17 is a similar diagrammatic view of the mechanism at the time of controlled breakage of the shaft/flap connection in the intermediate sealing configuration;

FIG. 18 is a schematic view of the device from FIG. 17 at a later time after the shaft has contacted an abutment; and FIG. 19 is a diagrammatic view of the mechanism at a later time after the flap has contacted an abutment.

DETAILED DESCRIPTION OF THE PREFERRED EMBODIMENT

Figure 2:
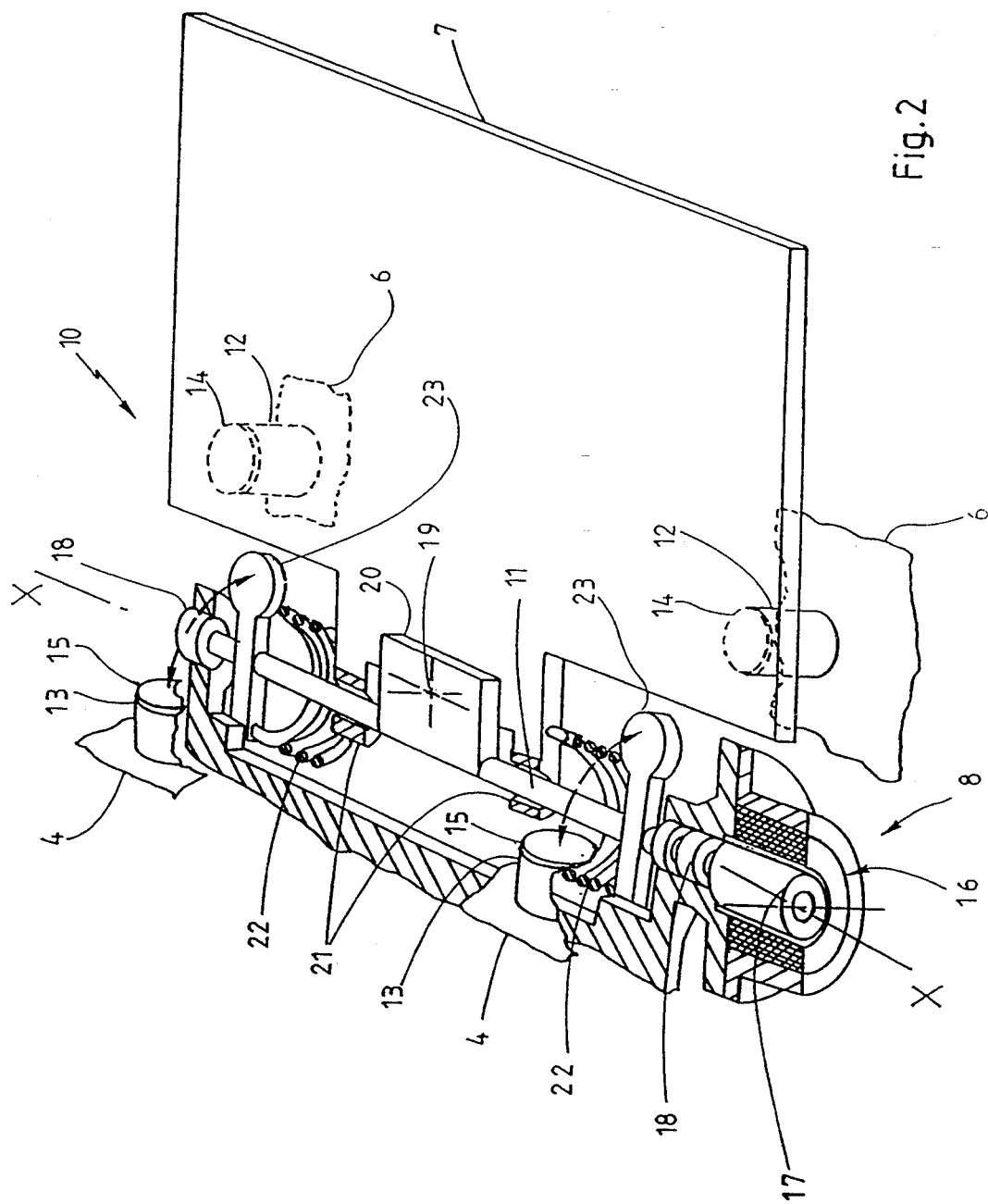
FIG. 2 is a partially cut away perspective view of the sealing mechanism.

FIG. 1 diagrammatically shows one example of the installation of an aperture baffle 1 fitted with a sealing mechanism in accordance with the invention attached to a body 2 of an optical instrument on board a space vehicle. The optical instrument may be on board an aircraft, although the reliability requirements are in this case usually less critical.

The optical system or instrument has an aperture 3 through which incident radiation R enters.

The aperture baffle 1 is constituted by a rear frame 4 joining three (in this example) sunshade flaps 5 to the aperture 3. A smaller fourth flap 6 joined to the frame 4 is also provided, for a reason to be explained later. This flap could be reduced to protuberances on the frame 4.

The aperture baffle 1 further includes a sealing flap 7 adapted to be rotated by a schematically represented mechanism 8 between an open configuration in which the flap leaves the aperture 3 uncovered, itself serving as a fourth sunshade (the fourth flap or wall 6, where it exists, can then be used to position the flap) and a closed configuration (direction of arrow F) in which the flap prevents any entry of light into the optical instrument.

In actual fact, as mentioned above, the sunshade flaps 5 (and 6 when present) are hinged within the baffle so that they can be stowed under the nose cap of the launch vehicle and then deployed in the service configuration. As this aspect is not in itself any part of the invention it will not be described in detail here, the sunshade flaps being mounted by any appropriate known means.

FIG. 2 shows one embodiment of a sealing device 10 formed by the members 7 and 8 from FIG. 1.

The device includes the sealing flap 7 which is joined to a hinge shaft 11 and rotatable about the longitudinal axis X—X of the shaft between an open configuration (shown) in which it is in contact with the abutments 12 fastened to the frame 4 coupled to the flap 6, for example, and a closed configuration (not shown) in which it comes into contact with abutments 13 joined to the frame 4 of the aperture baffle 1, for example. In practice the closed configuration is the launch (stowed) configuration.

The abutments 12 and 13 advantageously constitute magnets 14 and 15 to hold the flap in position (in which case the flap has magnetic portions—further magnets for example—adapted to come into face-to-face relationship with the magnets); in actual fact, a piece of non-magnetic material (not shown) is advantageously provided between the magnets or in their vicinity to prevent them from being damaged by impact (by preventing any contact between the magnets for example).

The hinge shaft 11 is rotated by an actuator 16, in this instance a torque motor whose rotor 17 is mounted directly on the shaft. This is a SAGEM 40 MCC motor for example.

The hinge shaft 11 rotates in roller bearing 18, for example, angular contact roller bearings, whose outside race is fastened to the aperture baffle 1 itself.

The sealing flap 7 is fixed to the hinge shaft 11 by a frangible controlled-break temporary connection component 19, a pyrotechnic device for example, connecting a part of the sealing flap 7 to a plate 20 fastened to the hinge shaft 11. The sealing flap further includes journal bearings 21 through which the hinge shaft 11 passes with a large clearance.

In practice this clearance can be in the order of one millimeter; it depends on the amplitude of unwanted transverse movement of the shaft due to vibrations during launch. The object is to as much as possible, even during launch, prevent contact and, therefore, mutual mechanical damage, between the hinge shaft 11 and the bearings 21.

Note that because the bearings do not have to withstand mechanical impact they can be made from materials of relatively low hardness but having good friction characteristics, such as self-lubricating materials like PTFE, which avoids the need to employ any additional lubricants likely to cause pollution.

The plate 20 is in face-to-face relationship with the sealing flap in a plane parallel to the flap passing at least approximately through the axis X—X.

At least one torsional resilient return device 22 is disposed between the hinge shaft 11 and the sealing flap 7 so as to bias the flap around the shaft in a direction adapted to apply the flap against the abutments 12 for holding it in the open configuration, the plate 20 being biased in the closing direction by reaction. Of course this relative rotation between the shaft and the flap can only be brought about by this torsion resilient energy after the temporary connection due to the component 19 is broken.

In the FIG. 2 embodiment areas 23 of the flap adapted to bear against the abutments 13 for holding the sealing flap in the closed configuration are in actual fact fastened to the hinge shaft 11, here closed by fingers whereby the hinge shaft 11 assumes an angular abutment position when the temporary connection due to the component 19 is broken, assuming of course, that the torsional energy stored in the resilient return device is sufficient. This guarantees correct locking of the flap in the open configuration.

Here there are two torsional resilient return devices in the form of coil springs wound around the hinge shaft 11 and fixed to the sealing flap and to the hinge shaft 11, in this example to the areas or fingers 23.

Mechanical redundancy is, therefore, introduced by the facility to decouple the sealing flap 7 and the hinge shaft 11.

Electrical redundancy can be provided by duplicating the winding of the actuator 16.

The mechanism implements the following three functions, starting from the closed configuration at launch:

a) opening in nominal mode (FIG. 3):

The action of the motor 16 when energized is sufficient in practice to unlock the sealing flap 7 held by the two permanent magnets 13 which are chosen to prevent the flap from moving in response to accelerations undergone in orbit. The motor then moves the flap from the closed position to the open position. Only the main guidance system is used, the hinge shaft 11 and the sealing flap 7 remaining fixed together.

The mechanism is then locked in the open position by the magnets 12;

b) closing in nominal mode:

The principle is the same as above, the hinge shaft turning in the opposite direction; and c) opening in degraded mode:

In the event of failure of a component used in the nominal mode the temporary connection provided by the component 19 is removed, in this example by a pyrotechnic cutting action (or alternatively—not shown—by an electromagnetic sucker or a thermal knife). The mechanism thereafter operates in the degraded mode.

It is assumed above that the motor is capable of pulling the flap 7 away from the magnets 13. In actual fact if the orbital accelerations likely to be encountered make it necessary to choose magnets that are too strong in the sense that their attraction will be difficult for the motor to overcome, a more sophisticated locking device may be used, for example one using solenoids, so that the force with which the abutments retain the flap can be varied.

There are various possible failure modes. Jamming in the closed position, i.e., sticking at the magnets 13 or binding of the bearings 18. The previously calibrated springs 22 rotate the flap about the hinge shaft 11 which remains stationary (due to jamming or binding of the bearings), retained by the locking system (FIG. 4). Guidance of the flap 7 is provided by the two redundant bearings 21. The sealing flap is then locked in the open position by the magnets 12. If this latter holding device should subsequently fail, the residual torque of the spring at the end of travel is sufficient to hold the flap open.

Motor failure can be mechanical (rotor/stator binding) or electrical (power failure, coil open-circuit). The mode of action is the same as previously described except that the shaft is not necessarily immobilized (FIG. 5); the spring acts first on the hinge shaft which has a lower moment of inertia than the flap. The shaft is brought into abutment with the locking devices in the closed position and in a second stage the sealing flap can rotate to the open position.

The locking device can also fail in the open position as after the motor stops it is in an unknown position. The mechanism operates as in the second case explained after separation of the shaft and the flap.

No function of the mechanism is able to close the sealing flap 7 in the event of failure of any part, but this is compatible with the original choice to give priority to reliable opening.

Note that the parts used to open the sealing flap in degraded mode have not previously been subjected to any mechanical loading other then their own impetus, whether in the nominal mode or at launch. In nominal mode operation and above all during launch there is no contact between the hinge shaft 11 and the redundant bearings 21; the spring remains in tension between the shaft and flap, but it is not used.

The forces exerted on the flap and the shaft at launch are absorbed by the nominal mode guidance system. The redundant bearings are, therefore, not loaded at launch because of the clearance in the guidance system.

Figure 6:
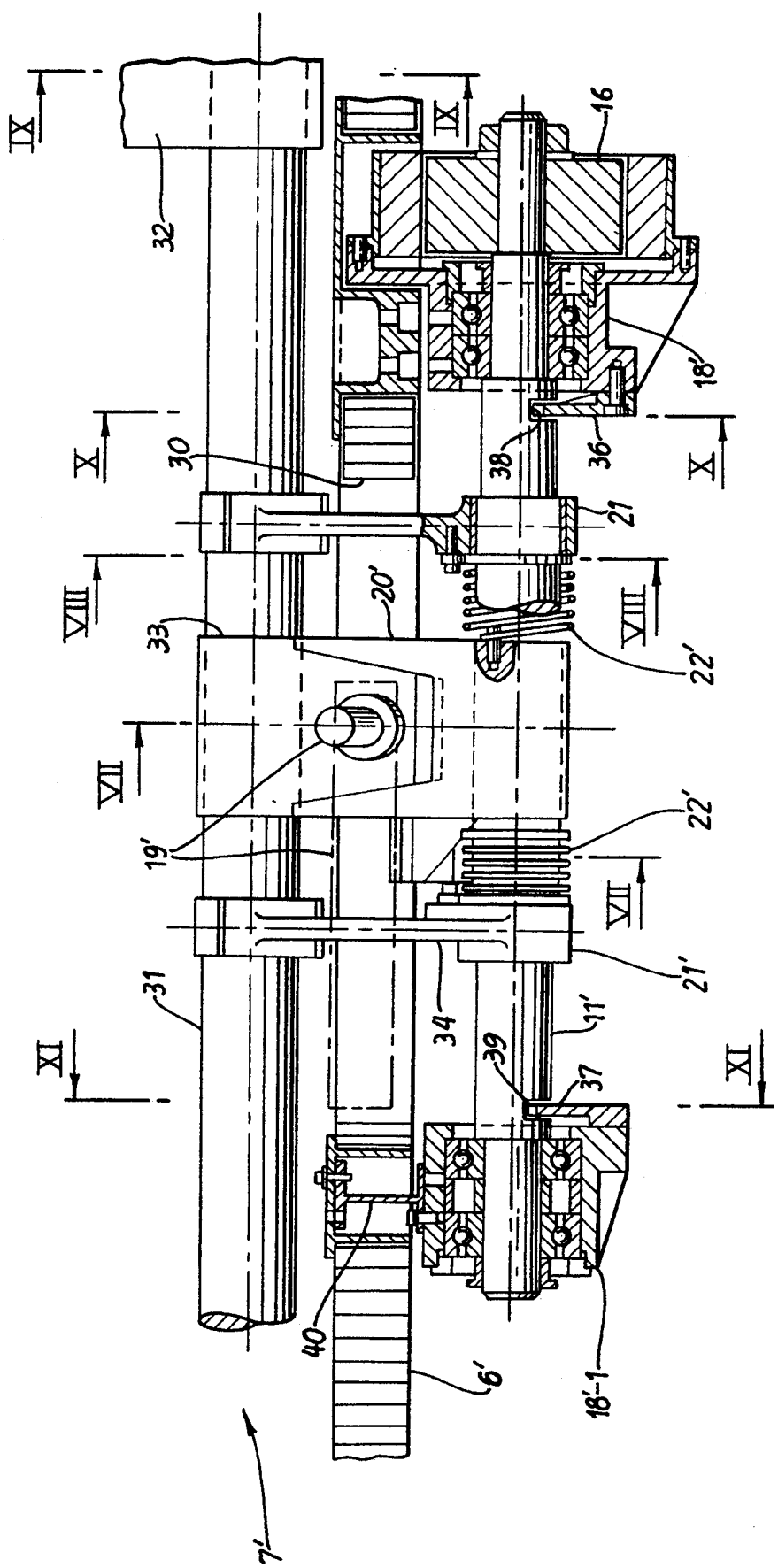
FIG. 6 is a partial view showing an alternative embodiment of the area in which the sealing flap is hinged to a support panel.
Figure 7:
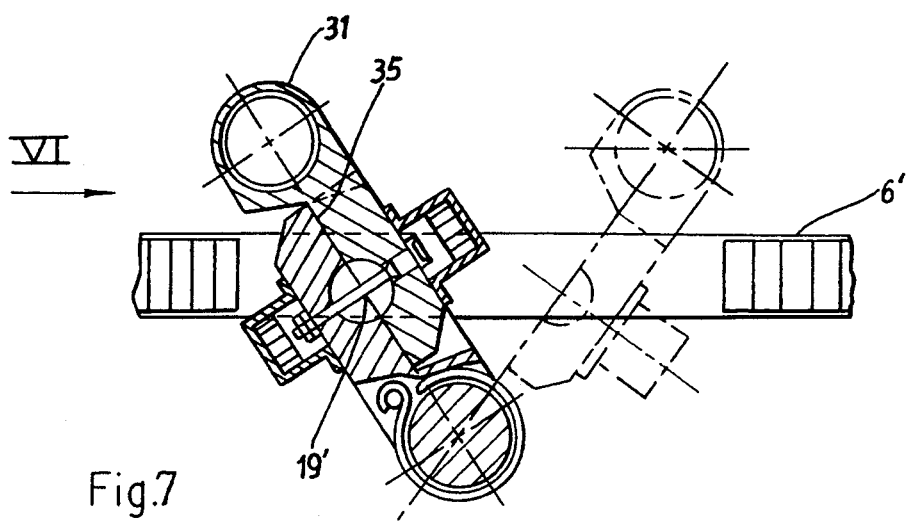
FIG. 7 is a partial view in transverse cross-section taken on line VII—VII in FIG. 6 showing the temporary connection between the hinge shaft and the flap.
Figure 8:
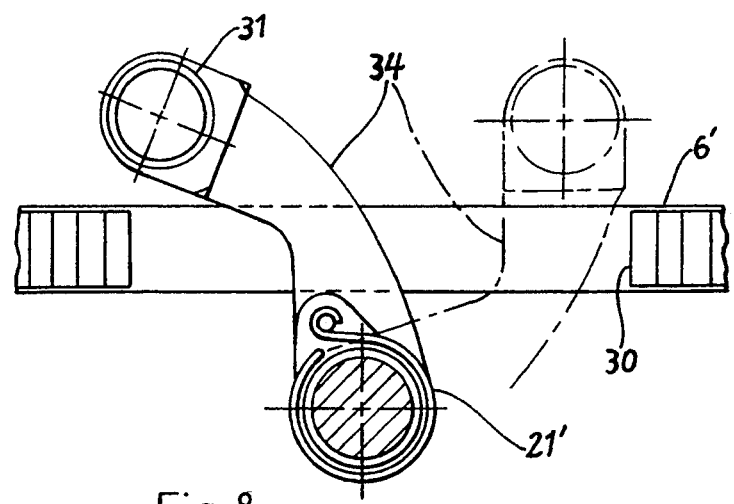
FIG. 8 is a partial view in transverse cross-section taken on the line VIII—VIII in FIG. 6 showing the redundant hinging of the flap to the shaft.
Figure 9:
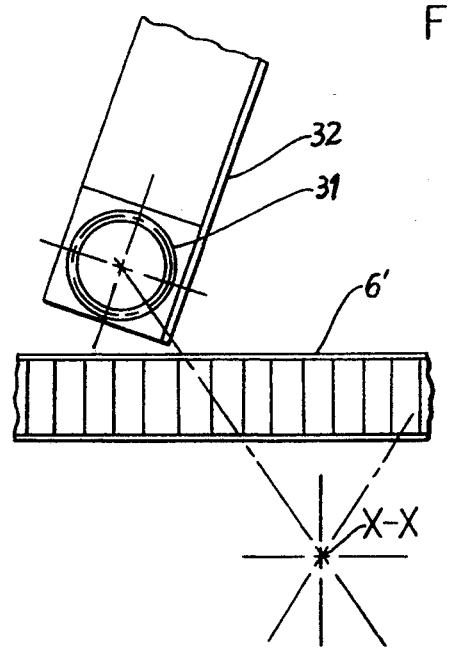
FIG. 9 is a partial view in transverse cross-section taken on the line IX—IX in FIG. 6 showing the sealing flap itself.
Figure 10:
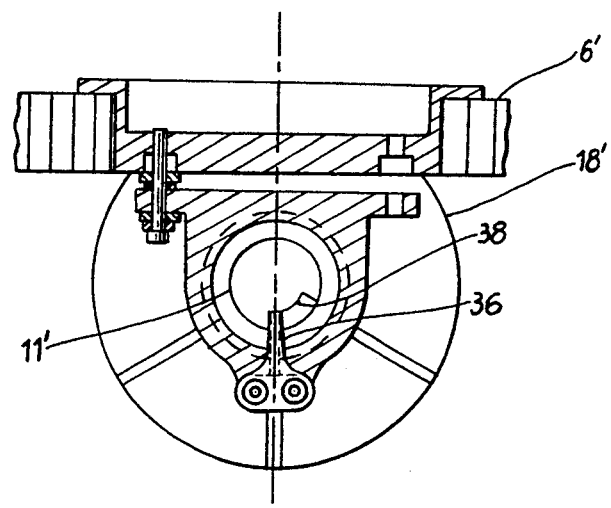
FIG. 10 is a partial view in transverse cross-section taken on the line X—X in FIG. 6 showing the right-hand bearing supporting the hinge shaft.
Figure 11:
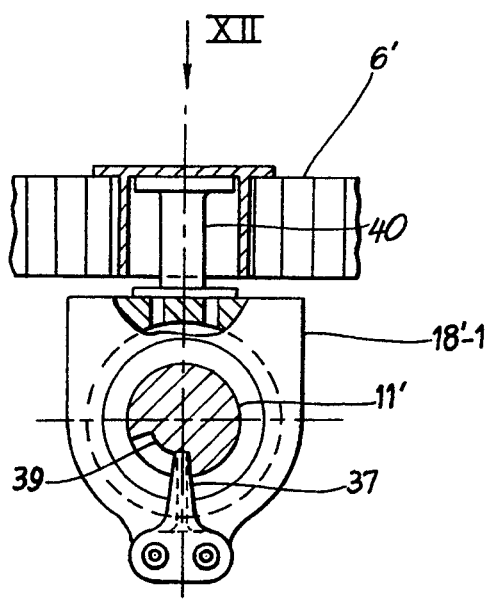
FIG. 11 is a similar partial view in transverse cross-section taken on the line XI—XI in FIG. 6 showing the left-hand bearing supporting the hinge shaft.
Figure 12:
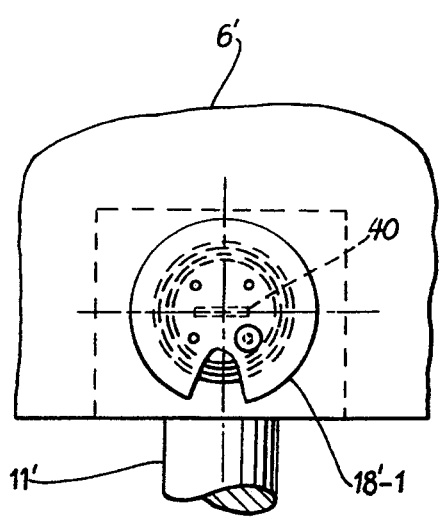
FIG. 12 is a top view as seen in the direction of the arrow XII in FIG. 11 of the left-hand bearing from FIG. 11, which is a rotary bearing.

FIGS. 6 and 12 show in more detail another embodiment in which parts similar to those in FIG. 2 have the same reference number "primed".

The hinge shaft 11' is disposed under a wall 6' of the aperture baffle along a slot 30 in the wall, which preferably is of honeycomb construction.

The sealing flap 7' includes a bar 31 connected to solid parts 32, parallel to the hinge shaft 11' and joined to it by a plate 33 temporarily attached to the plate 20' by a pyrotechnically operated temporary connection component 19'. Two arms 34 carrying journal bearings 21' at their ends are also fastened to this bar. The torsion springs 22' are respectively fixed to the central plate 20' and the arms 34.

An intermediate layer 35 is advantageously provided between the plates 20' and 33 and is made from a material adapted to prevent them from sticking together in the vacuum of space.

The range of angular movement of the hinge shaft is here defined by radial pins 36 and 37 fastened to the wall 6' and inserted in grooves 38 and 39 in the shaft 11'; the angular amplitude of these grooves determines the possible angular movement of the sealing flap 7' (70° for example) and determines the angular movement of the shaft when it is dissociated from the flap.

One bearing 18'-1 of the shaft 11' is joined to the flap 6' by a flexible blade 40 transversely disposed to the shaft 11'. This helps to reduce the risk of binding due to temperature variations for example.

Examples of functional and operational requirements that the invention helps to meet in the case of a telescope are explained hereinafter.

During launch the baffle must seal the telescope to avoid the entry of sunlight during deployment into the operational configuration.

In the operational phase it must limit the entry of sunlight into the telescope and reduce unwanted light. It must also seal the telescope in the event of temporary loss of attitude or of entry of the satellite into survival mode in order to prevent entry of sunlight into the telescope during such movements.

Because the geometry of the baffle in the operational configuration is incompatible with the constraints of installation under the nose cone, the baffle must be made up of elements that are stowed at launch and deployed in orbit.

A first deployment by pyrotechnic actuation of the stowage locking system is carried out in practice up to three days after the satellite is put on station.

The service life of the satellite in orbit can exceed five years.

The sealing device must be capable of operating in orbit several dozen (for example up to 200) times.

If the Sun's rays reach a minimum authorized angle of incidence (30° for example) to the sight axis Z, the instruction is given to close the sealing device and power is supplied immediately to the actuator or motor 16, even if there has been no movement for several years.

Instructions to open and close the flap may be produced at any time in orbit.

When the satellite is in survival mode (which may be the case for between one day and ten days) it describes a heliocentric orbit; the entry axis of the optical instrument is pointed towards the Sun in a cone whose half-angle at the apex is 15°.

It will be realized that a device like that shown in FIG. 2 simultaneously satisfies the following conditions:
there is no single point of failure;
the degraded mode is implemented by components that have not previously been mechanically loaded (at launch);
the design utilizes one component per function;
operation requires no significant input of energy (the lowest possible actuation forces); and
it is possible to lock the sealing flap in both open and closed positions.

Numerous variants may be put forward by one skilled in the art without departing from the scope of the invention. For example the sealing flap may be used with no sunshade 5 or 6; it may be mounted on the free edge of the aperture baffle and not necessarily inside it as shown.

The device in FIGS. 13 through 19 is a variant of that in the previous figures and has the same general structure.

Figure 13:
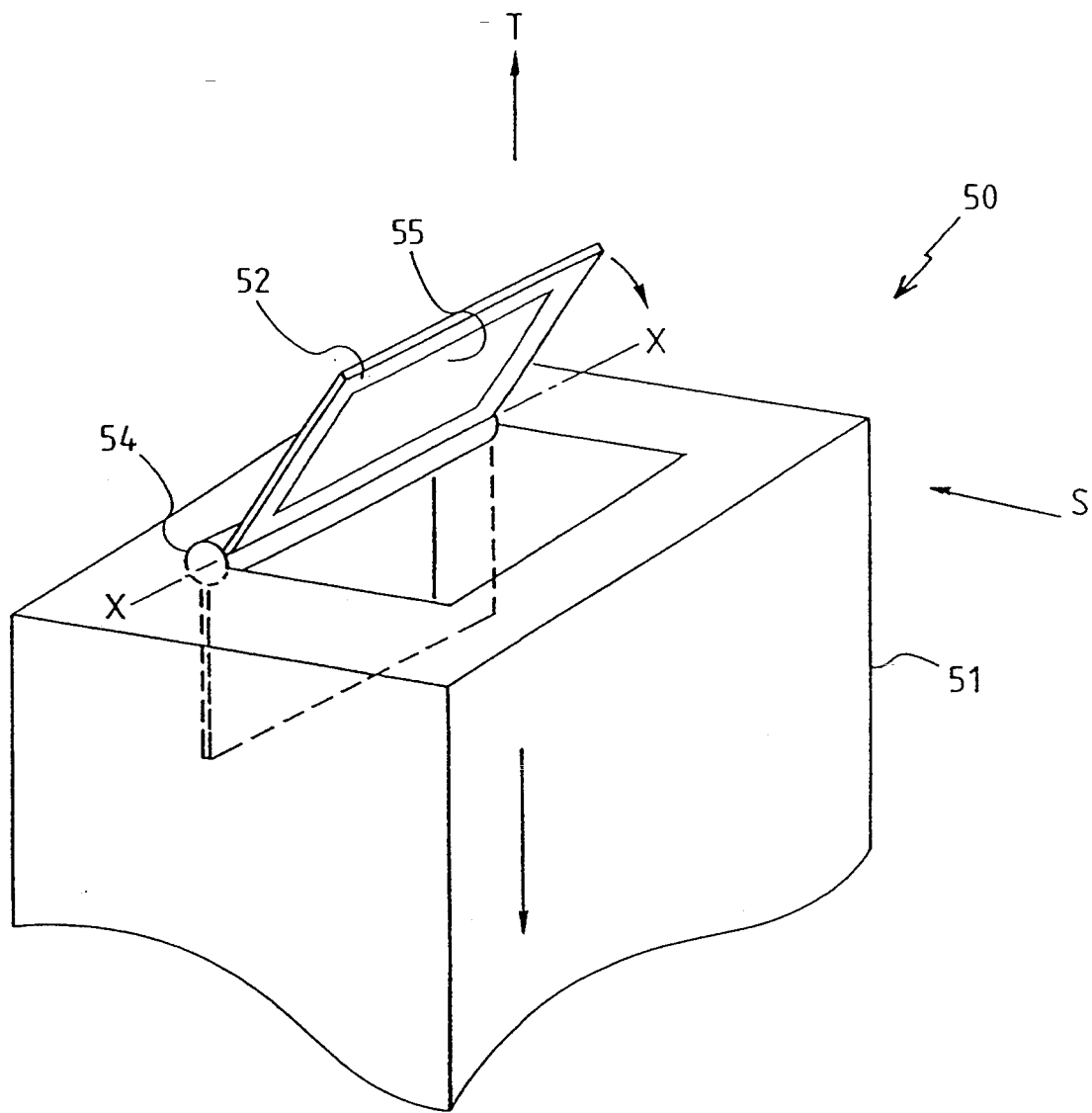
FIG. 13 is a perspective diagrammatic view of another embodiment, namely a space optical instrument sealing and calibration mechanism.

The hinged device for a space vehicle 50 includes a fixed support element 51 adapted to be fixed to the vehicle and a mobile auxiliary element 52 pivoting relative to the fixed support element about a hinge axis X—X between a first configuration (shown in FIGS. 13 and 15) and a second configuration (shown in dashed outline in FIG. 13 and in FIG. 14). The auxiliary element is fixed by a frangible controlled-break temporary connection component 53 to a hinge shaft 54 rotated between the first and second configurations by an actuator (preferably a torque motor). A torsional resilient return device is coupled to the auxiliary element and to the shaft and resiliently biases the auxiliary element to rotate about the shaft in a predetermined direction. The shaft is inserted with significant clearance in journal bearings attached to the auxiliary element.

Abutments 56 and 57 fastened to the fixed support element 51 delimit the angular movement of the flap. The flap bears against the abutment 56 in the open configuration and against the abutment 57 in the calibration configuration (or at the least it faces the latter: this depends on the precise position chosen for the calibration) through a portion 58 fastened to the shaft.

According to one feature of the invention that is original in itself, the same moving part provides both a sealing device and a diffuser device, because a diffuser panel 55 of any appropriate material, preferably of frosted glass, is provided on the inside surface of the flap and is adapted to assume at least three positions:
a position open 90° inwards (FIG. 14) which clears the field of the instrument, which is, therefore, able to observe the scene at which it is pointed;
a sealing position (FIG. 16) in which the flap completely fills the window in the aperture baffle of the instrument, no light reaching the interior; and
a 45° outwards calibration configuration position (FIG. 15) in which the flap holds the diffuser so that it is illuminated slantwise by the Sun. Note that the value of this angle is determined by the parameters of the orbit, the season and the exact position of the instrument in the orbit at the time selected to carry out the calibration operation.

The angular position commanded by the onboard computer is, therefore, likely to have any positive angular value, typically 45°, and to fluctuate during the year about its mean position.

This mechanism, very similar to that of the main device, has the following special features:
an a priori larger angular field, typically 135°;
the facility for intermediate positions in which the flap is held angularly in position by the holding torque of the motor (or possibly by a magnetic coupler or any other type of brake mounted on the hinge axis); the sealing position is merely one of a number of possible intermediate positions and not an extreme position; the field of the instrument is opened by rotating the flap towards the interior of the aperture baffle to limit aging of the diffuser by protecting it from incident solar radiation; and the "flap out" calibration position is determined either by a deployment abutment or by the angular set point of motor. In the latter case an end of travel abutment is additionally provided not far from this position to ensure that the torque needed to move the flap is applied to it if the frangible controlled-break component should be operated.

It goes without saying that the foregoing description has been given by way of non-limiting example only and that numerous variants may be proposed by one skilled in the art without departing from the scope of the invention.

What is claimed is:

1. An articulated device for use in a space vehicle comprising:
   a support member;
   a movable member pivotably attached to said support member to rotate about an axis, said movable member being rotatable between a first and second position;
   means mounted to said support member for pivoting said movable member about said axis;
   means for frangibly securing said movable member to said pivoting means, said frangibly securing means having a secured mode where said movable member is temporarily connected to said pivoting means and a fracture mode where said movable member is disconnected from said pivoting means; and
   means engaged with said movable member and said pivoting means for biasing said movable member to rotate relative to said pivoting means so as to urge said movable member toward one of said first and second positions when said frangibly securing means enters said fracture mode;
   whereby said movable member is rotated by said pivoting means while said frangible securing means remains in said secured mode, and wherein said fracture mode of said frangible securing means causes said movable member to rotate to said one of said first and second positions.

2. An articulated device according to claim 1 further comprising an optical instrument with an aperture, said support member being mounted near said aperture, wherein said movable member is a temporary sealing flap for closing said aperture in said first position and for providing access to said aperture in said second position.

3. An articulated device according to claim 2 wherein said movable member has a diffuser, said diffuser being oriented towards said aperture and towards incident radiation in said first position and said diffuser being oriented to provide access to said aperture in an intermediate position wherein said aperture is closed.

4. An articulated device according to claim 3 wherein said temporary sealing flap is inclined approximately 45° outwardly relative to said intermediate position when in said first position and is inclined approximately 90° inwardly relative to said intermediate position when in said second position.

5. An articulated device according to claim 2 further comprising a sunshine wall mounted to said space vehicle, said sunshade wall forming an aperture baffle for said optical instrument, said support member being mounted to said sunshade wall.

6. An articulated device according to claim 1 further comprising abutments rigidly fastened to said support member, said movable member abutting said abutments when in said first and second positions.

7. An articulated device according to claim 6 further comprising an abutment member attached to said pivoting means, wherein said movable member abuts at least one of said abutments when in said first position and wherein said movable member abuts at least a second of said abutments through said abutment member when in said second position.

8. An articulated device according to claim 1 further comprising means for locking said movable member in at least one of said first and second positions.

9. An articulated device according to claim 8 wherein said locking means is a magnetic locking means.

10. An articulated device according to claim 9 wherein said magnetic locking means comprises magnets to said support member and wherein said movable member has magnetic portions for cooperating with said magnets.

11. An articulated device according to claim 1 wherein said pivoting means comprises a torque motor.

12. An articulated device according to claim 1 wherein said frangible securing means is a pyrotechnic device.

13. An articulated device according to claim 1 wherein said pivoting means comprises a shaft and a plate rigidly fastened to said shaft in face-to-face relationship with said movable member in a plane passing at least approximately through said axis, said frangible securing means being disposed between said plate and said movable member, said biasing means urging said plate away from said movable member.

14. An articulated device according to claim 13 further comprising a layer of non-stick material disposed between said plate and said movable member.

15. An articulated device according to claim 1 wherein said biasing means is a coil spring.

16. An articulated device according to claim 1 wherein said movable member is a temporary sealing flap, said second position is an open configuration and said biasing means biases said temporary sealing flap towards said open configuration.

17. A space telescope comprising an articulated device, said articulated device comprising:
   a support member mounted to said space telescope;
   a movable member pivotably attached to said support member to rotate about an axis, said movable member being rotatable between a first and second position;
   means mounted to said support member for pivoting said movable member about said axis;
   means for frangibly securing said movable member to said pivoting means, said frangibly securing means having a secured mode where said movable member is temporarily connected to said pivoting means and a fracture mode where said movable member is disconnected from said pivoting means; and
   means engaged with said movable member and said pivoting means for biasing said movable member to rotate relative to said pivoting means so as to urge said movable member toward one of said first and second positions when said frangibly securing means enters said fracture mode;

whereby said movable member is rotated by said pivoting means while said frangibly securing means remains in said secured mode, and wherein said fracture mode of said frangibly securing means causes said movable member to rotate to said one of said first and second positions.

* * * * *

UNITED STATES PATENT AND TRADEMARK OFFICE
CERTIFICATE OF CORRECTION

PATENT NO.  : 5,384,661
DATED       : January 24, 1995
INVENTOR(S) : Freddy Geyer and Dominique Giraud It is certified that error appears in the above-indentified patent and that said Letters Patent is hereby corrected as shown below:

Column 8, line 56, delete "then" insert ---- than ----.

Column 12, line 2, delete "sunshine" insert ---- sunshade ----.

Column 12, line 24, after "nets" insert ---- fastened ----.

Signed and Sealed this

Twenty-fifth Day of April, 1995

BRUCE LEHMAN

*Attest:*

*Attesting Officer*     *Commissioner of Patents and Trademarks*